United States Patent [19]

Lindgren et al.

[11] Patent Number: 5,676,819
[45] Date of Patent: Oct. 14, 1997

[54] IN SITU REMOVAL OF CONTAMINATION FROM SOIL

[75] Inventors: Eric R. Lindgren; Patrick V. Brady, both of Albuquerque, N. Mex.

[73] Assignee: The United States of America as represented by the United States Department of Energy, Washington, D.C.

[21] Appl. No.: 636,613

[22] Filed: Apr. 23, 1996

[51] Int. Cl.⁶ .................................................. C25C 1/22
[52] U.S. Cl. ............................ 205/687; 205/43; 205/46; 205/688; 205/771; 204/515; 588/1; 588/204
[58] Field of Search ........................ 205/687, 688, 205/771, 43, 46; 204/515; 588/204, 1

[56] References Cited

U.S. PATENT DOCUMENTS 5,240,570  8/1993  Chang et al. .................... 204/515
5,398,756  3/1995  Brodsky et al. ................. 204/515
5,435,895  7/1995  Lindgren et al. ............... 204/515
5,458,747  10/1995  Marks et al. ................... 204/515
5,476,992  12/1995  Ho et al. ........................ 204/515

*Primary Examiner*—Arun S. Phasge
*Attorney, Agent, or Firm*—George H. Libman

[57] ABSTRACT

A process of remediation of cationic heavy metal contamination from soil utilizes gas phase manipulation to inhibit biodegradation of a chelating agent that is used in an electrokinesis process to remove the contamination, and further gas phase manipulation to stimulate biodegradation of the chelating agent after the contamination has been removed. The process ensures that the chelating agent is not attacked by bioorganisms in the soil prior to removal of the contamination, and that the chelating agent does not remain as a new contaminant after the process is completed.

22 Claims, 4 Drawing Sheets

IN SITU REMOVAL OF CONTAMINATION FROM SOIL

The United States Government has rights in this invention pursuant to Department of Energy Contract No. DE-AC04-94AL85000 with Sandia Corporation.

BACKGROUND OF THE INVENTION

There are many locations with unsaturated soils that are contaminated with metals and organic solvents. In situ remediation is often the most economically attractive technique for removing contaminants from contaminated soils. However, the success of any in situ treatment technology depends critically on the degree to which the movement of water and desired ions can be engineered in the subsurface. For example, substances used to chelate metals for remediation also have the potential to spread them in the subsurface if the substances are not controlled. Furthermore, bioremediation efforts in the vadose zone are limited by the ability of the soil to provide moisture and nutrients to contaminant-metabolizing microorganisms.

A preferred remediation technique is electrokinesis; an in situ process where a direct current is imposed between spaced electrodes implanted in the soil. The application of direct current in a soil-water system leads to at least two effects: ionic species dissolved in the soil-water solution migrate to the oppositely charged electrode (electromigration) at a rate which depends on the local potential gradient and the charge and mobility of the ion and, accompanying this migration, a bulk flow of soil-water is induced toward the cathode (electroosmosis) at a rate which depends on the local potential gradient and the soil zeta potential (as explained in detail in R. L. Hunter, *Zeta Potential In Colloid Science*, Academic Press, New York, 1981). The combination of these two phenomena leads to a net movement of ions towards one of the electrodes. Since the direction and rate of ion transport is not highly dependent on the hydraulic nature of the soil, ions may be introduced to or removed from soils of low hydraulic conductivity. Although it is difficult (or impossible) to effect by hydraulic means, desired ions can be introduced at the electrodes and contaminant ions arriving at the electrodes can be removed by mechanical extraction techniques.

When electric current is passed through an aqueous solution, electron transfer reactions must occur at the electrode surface in order to transfer the current from the metallic media where free electrons carry the current to the aqueous media where ions carry the current. Under most conditions, the electrolysis of water at each electrode is the predominant electron transfer reaction:

$$H_2O \rightarrow \tfrac{1}{2}O_2(g) + 2H^+ + 2e^- \quad (1)$$

forming acidic conditions at the anode which propagates toward the cathode and

$$2H_2O + 2e^- \rightarrow H_2(g) + 2OH^- \quad (2)$$

forming basic conditions at the cathode which propagates toward the anode.

Electrokinetic remediation shows great promise for moisture conditions near saturation in both laboratory cell experiments (A. N. Alshawabkeh and Y. B. Acar, *Removal of Contaminants from Soils by Electrokinetics: A Theoretical Treatise*, J. Environ. Sci. Health, A27(7), 1835–1861 (1992); and R. F. Probstein and R. E. Hicks, *Removal of Contaminants from Soils by Electric Fields*, Science, 260, 498–503 (1993)), and in field trials (R. Lageman, *Environ. Sci. Technol.*, 27, 2648 (1993)). However, it may be desirable to avoid saturating a contaminant plume that resides in the vadose zone, to keep from transporting the contaminants to the subsoil.

Electrokinetic remediation is applicable to unsaturated soil systems as long as there is an electrical connection through the pore water between the electrodes. An electrokinetic extraction system described in U.S. Pat. No. 5,435,895 of E. Lindgren et al. performs electrokinetic remediation in unsaturated soils in an environmentally safe manner by limiting and controlling the amount and rate of moisture addition to the soil. In laboratory tests that utilize a similar electrode extraction system, 75–90% of soluble chromium has been removed from the soil. These experiments were conducted at an average moisture content from 12 to 15 wt % (approximately 40–60% saturation). The average moisture content did not vary significantly from the beginning to the end of the experiment.

The electrokinetic electrode system of the '895 patent consists of an upper plastic well casing with a lower porous ceramic section which contains the active portion of the electrode system. A constant electrolyte solution level is maintained above the ceramic/plastic interface and the solution is held under tension by applying a vacuum to the casing head space. This applied vacuum limits the degree of saturation that soils adjacent to the electrode casings will attain and assures that the field capacity of the soils is never exceeded. A drive electrode is deployed within the electrolye solution to complete the electrical connection with the soil. When a DC current is passed between electrodes electrolysis reactions form hydrogen ions at the anode and hydroxyl ions at the cathode. A pumping system circulates the electrolyte solution past a pH probe and controls the addition of neutralizing agents to maintain the pH at a desired level. Contamination is removed from the system in a small effluent stream from each electrode system, and is treated for disposal.

The design of the aforementioned electrode system allows the in situ removal of anionic contaminants from unsaturated soils. Anionic forms of heavy metal contaminants (e.g., $CrO_4^=$, $MoO_4^=$, $SeO_3^=$, $HAsO_4^=$, $TcO_4^-$, $UO_2(CO_3)_2^=$, etc.) are typically highly water soluble, adsorb weakly to most soil surfaces, and are therefore amenable to the electrokinetic extraction process of the '895 patent.

However, cationic forms of heavy metal contaminants ($UO_2^{++}$, $Pb^{++}$, etc.) typically adsorb strongly to soil surfaces, or form highly insoluble precipitates, especially in alkaline soil commonly found in the add Western USA. Since most cationic contaminants are insoluble, or strongly sorbed to mineral surfaces, they are not immediately amenable to the electrokinetic extraction process of the '895 patent. Such cationic contaminants must be brought into solution before they can be removed electrokinetically.

One method for solubilizing cationic contaminants, as described in U.S. Pat. No. 5,137,608 of Acar et al., is to propagate an acid front, generated by water oxidation at the anode, across the soil to the cathode. Reducing the soil pH to about 2 in this manner effectively solubilizes many heavy metals as cations which are then attracted to the cathode. However, this large change in soil pH causes many undesirable geochemical changes which can be difficult to predict and can lead to unexpected results.

An alternative approach, which avoids the large-scale perturbation of the soil-solution system, is to solubilize and/or detach cationic contaminants from soil surfaces by electrokinetically flushing the soil solution with a ligand which forms strong aqueous complexes with the given contaminant. In this latter process, the electrode reactions are buffered to maintain near neutral pH conditions. The neutralization reaction essentially exchanges the hydroxyl ion with a chelating ion and the hydrogen ion with a sodium or other bio-nutrient ion depending on the neutralizing agent. For example, citrate is preferably introduced electrokinetically into the soil by using citric acid to neutralize the hydroxyl ions formed by reaction 2. Because this method eliminates soil pH shifts, it is an optimal approach for electromigrating ions into soils. Other methods such as introducing a salt are ineffective because the mobility of the hydroxyl and hydrogen ions are much greater than any other ions. The unwanted result is that $H^+$ and $OH^-$ ultimately transport most of the current, rather than the contaminants or mobilizing agents. By neutralizing acid and base production stoichiometrically, the concentrations of $H^+$ and $OH^-$ ions are minimized and the addition rate of desired ions to the soil is maximized and is proportional to the imposed current.

Recent theoretical calculations (E. R. Lindgren et al., "Numerical Simulation of Electokinetic Phenomena", *Emerging Technologies in Hazardous Waste Management V*; ACS Symposium Series, 607, 1995) show that the maximum concentration of a mobilizing agent that can be distributed through the pore water is roughly equal to the ionic strength of the pore-water. Pore water ionic strengths for saturated soils typically range from 1 to 10 mM, and for unsaturated soils from 10 to 100 mM. Concentrations less than the initial ionic strength can be achieved by using a mix of neutralizing agents at the electrode. For example, the final concentration of citrate can be reduced by a factor of ten by using a ten to one mix of hydrochloric and citric acids to neutralize the electrolysis reactions at the cathode.

Electrokinetic processes look promising for enhancing bioremediation in unsaturated soils. Microorganisms in deep vadose zones are typically nutrient-limited because of the lack of moisture. Performance is improved if moisture is added along with the air (R. R. Dupont et al., "Assessment of in situ bioremediation potential and application of bioventing at a fuel contaminated site", *In Situ Bioremediation: Applications and Investigations for Hydrocarbon and Contaminated Site Remediation*, Butterworth-Heinemann, Boston, Mass., 1991, pp. 262–282). Thus, in many cases it appears that the primary limitations to stimulating bioremediation in arid vadose soils are the supply of moisture and oxygen.

SUMMARY OF THE INVENTION

It is an object of this invention to provide a method for in situ removal of precipitated, insoluble, or strongly adsorbed heavy metal or radionuclide organic contamination from soil.

It is also an object of this invention to electrokinetically mobilize otherwise inert cationic contaminants with organic mobilizing agents.

It is another object of this invention to prevent subsurface contamination by bioremediation of organic mobilizing agents after remediation of other contaminants by the mobilizing agents.

It is a further object of the invention to use gas phase manipulation to both retard biodegradation of a mobilizing agent prior and during remediation of a contaminant, and to stimulate biodegradation of the agent after remediation of the contaminant.

Additional objects, advantages, and novel features of the invention will become apparent to those skilled in the art upon examination of the following description or may be learned by practice of the invention. The objects and advantages of the invention may be realized and attained as particularly pointed out in the appended claims.

To achieve the foregoing and other objects, and in accordance with the purpose of the present invention, as embodied and broadly described herein, the present invention may comprise a method of enhancing electrokinetic remediation of heavy metal or organic contaminants from a contaminated soil area comprising first treating the soil to decrease the rate of biodegradation of an organic mobilizing agent; applying the organic mobilizing agent to the soil; causing the mobilizing agent to remove the contaminants from the soil; and finally treating the soil to increase the rate of biodegradation of the organic mobilizing agent. In a preferred embodiment, the invention is a method of enhancing electrokinetic remediation of heavy metal from a contaminated soil area comprising treating the soil to decrease the rate of biodegradation of an applied organic complexing agent; applying an organic complexing agent to the soil, the agent dissolving the heavy metal to form anionic complexes; electrokinetically removing the heavy metal from the soil; and treating the soil to increase the rate of biodegradation of the applied organic complexing agent.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

The electrokinetic electrode system described in the '895 patent can increase the moisture content of vadose soils. By properly controlling the vacuum and other operational parameters, the rate and amount of water which enters the soil can be controlled and moisture levels maintained below the field capacity of the soil. When operated in arid soils (moisture contents <10 wt %), an unsaturated wetting front can be propagated from the anode to the cathode by electroosmosis at a rate of about 1 cm/day. Water added between the electrodes is also moved by electroosmosis. In practice, this water could be added through open ended tubing installed in 1 inch diameter hydropunched holes. Desirable reagents (such as other needed nutrients, electron donors or electron acceptors) could be added as well. These new methods provide the means to increase the moisture content in a well defined treatment zone. The dry soil outside of the treatment zone acts as an insulating boundary and focuses the applied current into the desired treatment zone, increasing the efficiency of the electrokinetic process.

In accordance with a preferred embodiment of this invention, soil contaminated with heavy metals is treated without harming indigenous microbes to ensure that an organic chelating agent (typically a polycarboxylate such as citrate for metals) are not biodegrated and, therefore, are able to solubilize the precipitated or strongly adsorbed heavy metal (or radionuclide) contamination as an anionic complexes. Under electrokinesis, these complexes migrate toward the anode in an electric field. The organic chelating agent is preferably introduced into the soil at the cathode by neutralizing the base formation (as seen in equation 2 to be the result of the hydroxyl ion formation from the electrolysis of water at the cathode) with an acidic form of the chelating agent. The chelating agent then migrates towards the anode in the electric field and forms anionic complexes with metal ions along the way which continue to migrate towards the anode. The contaminants are then removed from the soil at the anode. Subsequently, the soil is again treated to ensure the biodegradation of remaining chelating agents.

A preferred structure for accomplishing the method of this invention in unsaturated soils is disclosed in related U.S. Pat. No. 5,435,895, which patent is incorporated into this application by reference thereto.

Figure 1A:
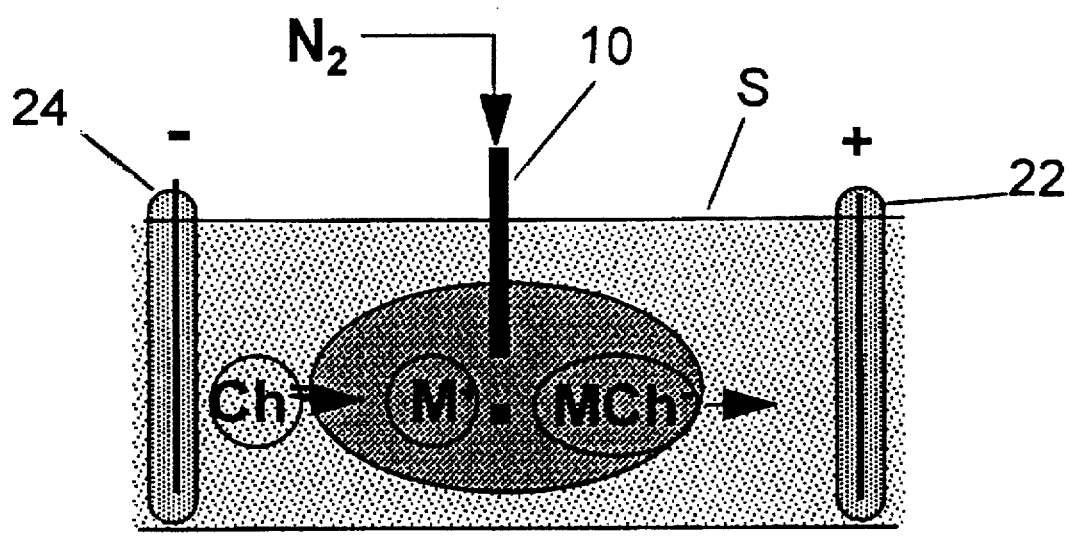
FIG. 1A shows the first steps of the method of the invention.
Figure 1B:
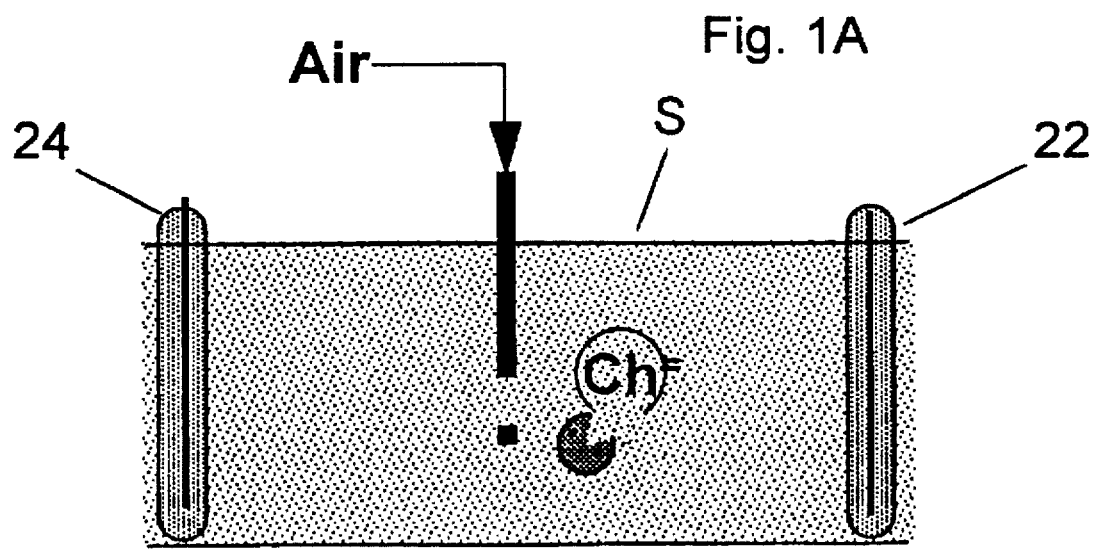
FIG. 1B shows the final steps of the method of the invention.

As shown in FIGS. 1A and 1B, at least one cathode 24 and anode 22 are embedded in a soil volume S. The construction of each of cathode 24 and anode 22 is shown in the referenced '895 patent. FIG. 1A shows soil S to be contaminated with a cationic form of heavy metal contaminant such as $UO_2^{++}$, represented in the figure as M+. In accordance with the method of this invention, prior to electrokinesis, a nitrogen purge is applied to soil S through porous pipe 10, a standard plastic well casing with a section of well screen in the region of soil where gas or water is to be injected) embedded between anode 22 and cathode 24. Similar extraction wells (not shown) may also be used to efficiently purge the soil gas. The nitrogen purge, which preferably continues during electrokinesis, serves to turn "off" the biodegradation of the chelating agent by naturally occuring organisms in the soil which, if not inhibited by the purge, would decompose the chelating agent before it could perform its cleansing task during electrokinesis. The zone of influence of this gas phase manipulation of the soil is preferably made larger than the zone of influence of the electrokinetic remediation.

The chelating agent is applied to soil S through cathode 24. When an electric potential is placed across the electrodes, the chelating agent neutralizes the electrode reaction at the cathode 24, and the chelate ion Ch= will then be electromigrated toward the anode 22. When the citrate front encounters adsorbed heavy metal contamination M+, it forms an anionic complex MCh− with heavy metal in the pore water. This anionic complex will be driven toward the anode by the imposed electric field. Once the metal complex reaches the anode 22, it will enter the electrode casing and be removed in the effluent stream as described in the '895 patent.

After the removal rate of heavy metal M drops to levels indicating the remediation is complete, the electrokinetic addition of chelating agent to the soil is discontinued, the nitrogen purge is discontinued, and as much chelating agent as possible is removed electrokinetically or left for biodegradation. The treatment zone is then biostimulated as shown in FIG. 1B by venting air or oxygen (and moisture, if necessary) into the vapor space of the unsaturated soil S through pipe 10 to effectively remove the residual chelating agent from the subsurface. This form of gas phase manipulation by an electron acceptor such as oxygen serves to turn the organisms in the soil back "on" so they naturally attack chelating agents that remain in the soil before they have a chance to leach deeper in to subsurface zones.

Remediation of soil S is then complete, as the contaminant has been removed at the anode 22 and the chelating agent has either been removed by the electrokinesis process or biodegraded by the microorganisms elements turned "on" by the biostimulation of FIG. 1B.

A practical advantage of this invention is that the introduction of mobilizing agents into a contaminated region would not be allowed by many regulatory agencies unless excellent control and complete post-treatment removal of the chelating agent can be demonstrated, because of the possibility that any mobilizing agent that remained after remediation could carry any remnants of the contaminant deep into the subsurface. Therefore, the organic mobilizing agent must be selective for the targeted contaminant and not complex readily with prevalent non-target cations such as calcium or magnesium. Also, the agent must readily biodegrade. Citrate is known to be an acceptable chelating agent for the removal of uranium in soil washing processes, (see *Removal of Uranium from Uranium-Contaminated Soils, Phase 1: Bench-Scale Testing*, Oak Ridge National Laboratory, ORNL-6762, September 1993.) Residual free citrate biodegrades easily, yet it is also easily prevented from biodegrading by the gas phase manipulation of the invention. And although complexed citrate may resist biodegradation, equilibrium of the biodegradation process should liberate more citrate which would then be available for continued biodegradation.

As discussed above, in situ control of the biodegradation process is possible in unsaturated soils by gas phase manipulation, which allows a broader range of mobilizing agents to be considered. For example, without the control provided by gas phase manipulation in the preferred embodiment, a highly biodegradable chelating agent such as citrate would be naturally decomposed by soil organism before it could traverse the treatment region. However, it may be used if the rapid biodegradation process is first turned "off" by injecting nitrogen gas into the vapor space of the unsaturated soil in the treatment zone. The nitrogen eliminates aerobic biological process which are much faster than anaerobic biodegradation processes. With the treatment zone nitrogen purged, the chelating agent may be introduced into the soil and the solubilized contamination removed at the anode. Additional nutrients for in situ bioremediation may be electrokinetically added at the same time if required.

Figure 2:
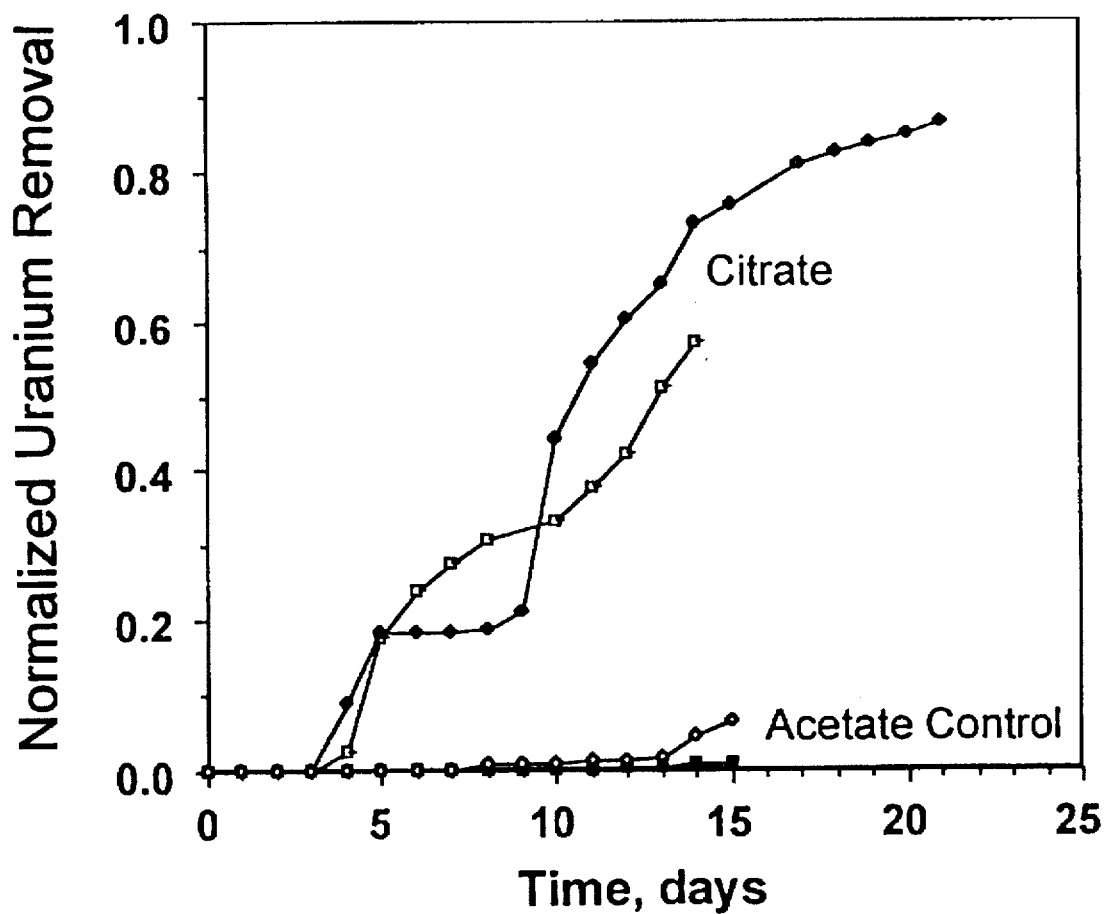
FIG. 2 shows uranium removal from unsaturated soil as a function of time.

The conclusions upon which this invention is based have been substantiated by experiment. FIG. 2 shows the results of experiments demonstrating that uranyl ions placed in unsterilized unsaturated soil (10 wt %) are not effectively moved by an electric field using acetic acid as a cathode buffer. However, if citric acid is used to buffer the cathode, over 90% of the uranium can be recovered at the anode. This demonstrates that citrate can be introduced electrokinetically and forms a stable anionic complex with uranium. This experiment was performed using an experimental method similar to that described by E. Mattson et al., "Electrokinetic Extraction of Chromate from Unsaturated Soils," *Energy Technologies in Hazardous Waste Management V*, ACS Symposium Series, 607, 1995, except that $UO_2(NO_3)_2$ was used to contaminate the soil and a citrate buffer was used as the cathode electrolyte.

Figure 3:
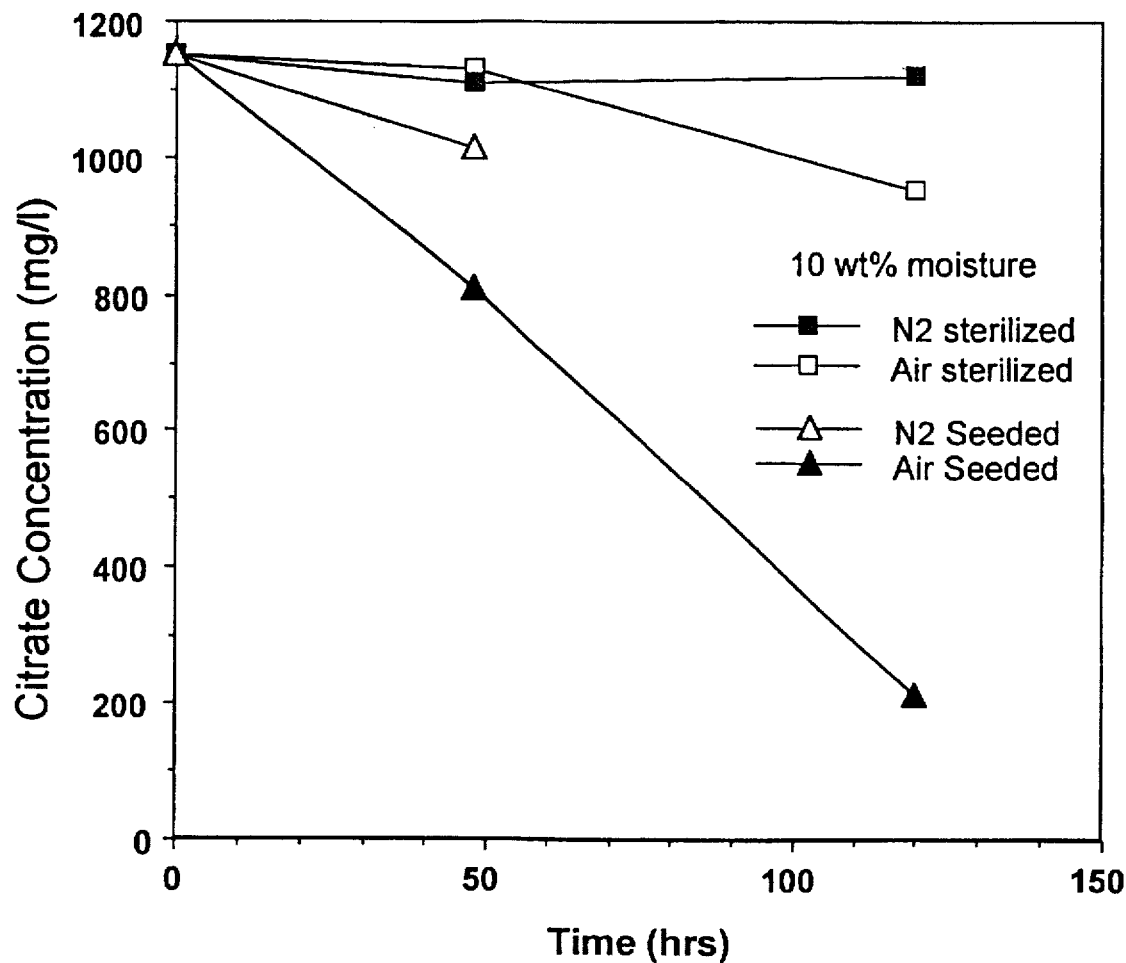
FIG. 3 shows biodegradation of citrate in unsaturated soils.

The biodegradation rates of free citrate was measured in solutions and in unsaturated soil. FIG. 3 shows the biodegradation of free citrate in unsaturated soil which is purged with moist air and nitrogen. Also shown is the citrate concentration in two control experiments using sterilized soil. The initial citrate concentration is 6 mM which should be a typical residual concentration after using citrate to mobilize uranium. When purged with air, citrate biodegrades very quickly at a rate only 50% lower than in solution under ideal conditions. These results indicate all of the free citrate could be biodegraded in less than one week. When purged with nitrogen, the apparent biodegradation rate was significantly less than when purged with air and may not be statistically different from the sterilized controls. (The nitrogen purge was accidentally lost overnight invalidating the 120 hour result for the $N_2$ seeded experiment.)

Figure 4:
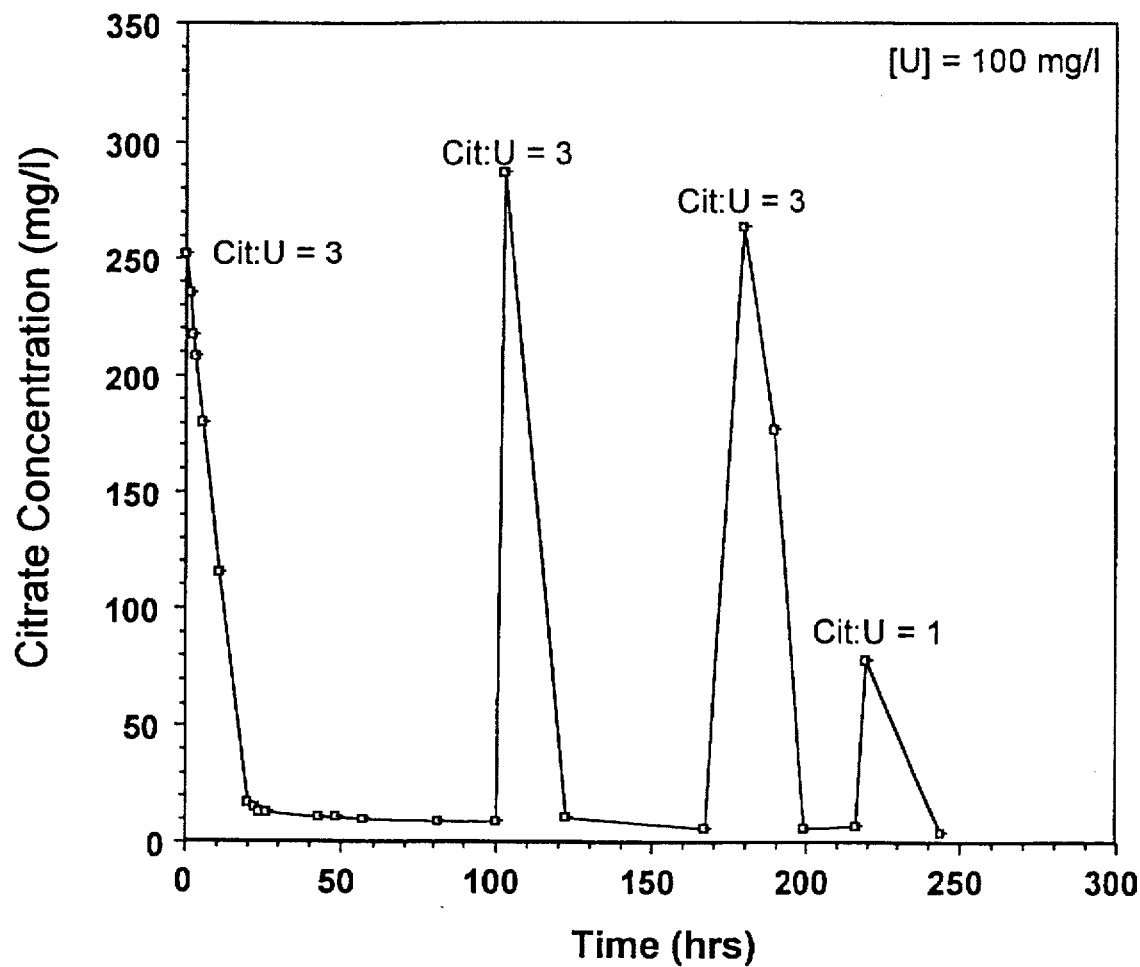
FIG. 4 shows biodegradation of uranium citrate complex in solution.

FIG. 4 shows experimental from results that the uranium citrate complexes will also biodegrade appreciably. The figure shows the biodegradation of citrate complexed uranium at a citrate to uranium molar ratio of three. The biodegradation rate of the complexed uranium is comparable to free citrate and essentially complete removal was achieved in 25 hours. Additional citrate was added at 110 hours and 180 hours to return the citrate:U molar ratio back to three and each time the citrate rapidly biodegraded. At 240 hours additional citrate was added to form a molar ratio of one and again the citrate rapidly biodegraded.

In summary, all aspects of the proposed method have been experimentally demonstrated. The complexing agent was shown to biodegrade in unsaturated soils and this rate could be significantly reduced by purging the soil with nitrogen. An adsorbed contaminant was mobilized by an electrokinetically introduces organic complexing agent and over 90% of the contamination was electrokinetically removed. The complexing agent was shown to biodegrade in the complexed and free forms.

The particular sizes and equipment discussed above are cited merely to illustrate a particular embodiment of this invention. It is contemplated that the use of the invention may involve components having different sizes and shapes as long as the principle, treating the soil to minimize degradation of the mobilizing agent, applying the mobilizing agent and causing the mobilizing agent to remove the contamination, and treating the soil to degrade the mobilizing agent, is followed. For example, although a citrate chelating agent is disclosed in the preferred embodiment for the removal of uranium, other organic mobilizing agents such as anionic surfactant (for example, sodium dodecyl sulfate) may be utilized to remediate organic contaminants. In addition to being used in unsaturated soils with the system of the '895 patent, it is also contemplated that this invention could be used with other soil remediation systems such as the system disclosed in U.S. Pat. No. 5,433,829 of W. Pool in saturated soils. In addition, missing but necessary nutrients may be added to the soil by gas phase (ammonia) or electrokinesis ($NO_3^-$, $SO_2^-$, $NH_4^+$, acetate, etc.). It is intended that the scope of the invention be defined by the claims appended hereto.

I claim:

1. A method of enhancing remediation of heavy metal or organic contamination from a contaminated soil area comprising:

first treating the soil to decrease the rate of biodegradation of an organic mobilizing agent;

applying the organic mobilizing agent to the soil;

causing the mobilizing agent to remove the contamination from the soil; and finally treating the soil to increase the rate of biodegration of the organic mobilizing agent.

2. The method of claim 1 wherein said contaminated soil area has spaced electrodes implanted therein, said step of causing the mobilizing agent to remove the contaminant includes applying a direct current across said electrodes to cause electrokinetic remediation.

3. The method of claim 2 where in said organic mobilizing agent is a chelating agent.

4. The method of claim 3 wherein the chelating agent is citrate.

5. The method of claim 4 wherein step of first treating the soil comprises adding a gas to the soil.

6. The method of claim 5 wherein the added gas is nitrogen.

7. The method of claim 5 wherein said first treatment continues after the step of causing the mobilizing agent to remove the contaminant has begun.

8. The method of claim 7 wherein said first treatment continues until the step of causing the mobilizing agent to remove the contaminant has ended.

9. The method of claim 7 wherein said step of finally treating the soil comprises adding at least one of air or oxygen to the soil.

10. The method of claim 9 wherein said step of finally treating the soil further comprising adding moisture to the soil.

11. The method of claim 2 wherein said organic mobilizing agent is a surfactant.

12. The method of claim 1 wherein step of first treating the soil comprises adding a gas to the soil.

13. The method of claim 12 wherein the organic mobilizing agent is a chelating agent.

14. The method of claim 13 wherein the chelating agent is citrate.

15. The method of claim 14 wherein the added gas is nitrogen.

16. The method of claim 15 wherein said first treatment continues after the step of causing the mobilizing agent to remove the contaminant has begun.

17. The method of claim 16 wherein said first treatment continues until the step of causing the mobilizing agent to remove the contaminant has ended.

18. The method of claim 12 wherein the organic mobilizing agent is a surfactant.

19. The method of claim 12 wherein said first treatment continues after the step of causing the mobilizing agent to remove the contaminant has begun.

20. The method of claim 19 wherein said first treatment continues until the step of causing the mobilizing agent to remove the contaminant has ended.

21. The method of claim 12 wherein said step of finally treating the soil comprises adding at least one of air or oxygen to the soil.

22. The method of claim 21 wherein said step of finally treating the soil further comprising adding moisture to the soil.

* * * * *